United States Patent [19]

Fujisawa

[11] Patent Number: 4,690,448
[45] Date of Patent: Sep. 1, 1987

[54] CONSOLE BOX FOR AUTOMOBILE

[75] Inventor: Naoki Fujisawa, Toyota, Japan

[73] Assignee: Toyota Jidosha Kabushiki Kaisha, Aichi, Japan

[21] Appl. No.: 885,156

[22] Filed: Jul. 14, 1986

[30] Foreign Application Priority Data

Jul. 16, 1985 [JP] Japan ................. 60-108605

[51] Int. Cl.$^4$ ............................................. B60R 7/04
[52] U.S. Cl. ................................................ 296/37.8
[58] Field of Search .................... 296/37.8, 37.1, 37.14

[56] References Cited

U.S. PATENT DOCUMENTS 4,453,759  6/1984  Kathiria .................... 296/37.8
4,568,117  2/1986  McElfish .................... 296/37.8

FOREIGN PATENT DOCUMENTS 180339  10/1983  Japan ................... 296/37.8

Primary Examiner—Robert R. Song
Attorney, Agent, or Firm—Parkhurst & Oliff

[57] ABSTRACT

A console box of the longitudinal split type for an automobile split longitudinally into front and rear blocks. Upwardly and downwardly projecting strips engage with each other at the ends of opposed upper walls of the split front and rear blocks. An extension projects toward the block having the upwardly projecting strip from the side wall of the block provided with the downwardly projecting strip. A cutout corresponding to the extension and a platelike seat capable of contacting the inner surface of the side wall of the block with the downwardly projecting strip, are formed in the block with the upwardly projecting strip. Thus, the console box can be simply assembled.

6 Claims, 7 Drawing Figures

CONSOLE BOX FOR AUTOMOBILE

BACKGROUND OF THE INVENTION

This invention relates to improvements in a coupling structure of a console box of the longitudinally split type for an automobile.

A conventional coupling structure of a console box of the longitudinal split type is disclosed in Japanese Utility Model Application No. 62544/85.

This conventional console box is formed, at the upper edge of a combination opening of a first block fixed to a vehicle body side, with a downward flange; at the inner surfaces of two side skirts of the opening with a protruding boss having a flat upper surface perpendicular to the vertical direction of the downward flange; at the upper edge of a combination opening of a second block coupled with the first block with a second flange extended to form an upward groove in the second block to be tightly engaged with the downward flange of the first block; and at the outer surface of extended flanges of two side vertical walls with an L-shaped guide rib having a lower flat portion tightly in contact with the flat upper surface of a rear portion of the boss. Thus, the blocks are engaged with the downward flange and upward groove. The flat upper surface of the boss and the flat downward portion of the guide rib are tightly contacted and the combination openings are superposed integrally by clamping with screws.

In order to assemble this conventional console box, the combination opening of the first block fixed to the vehicle body is contacted with the combination opening of the second block in a slightly forwardly tilted attitude. The downward flange of the first block is opposed to the upward groove in the second block. The L-shaped guide rib of the second block is opposed to the flat upper surface of the boss of the first block. The second block is then pivoted to a horizontal position. As such, the downward flange is tightly engaged within the upward groove, and the flat downward portion of the guide rib is tightly contacted with the flat upper surface of the boss. When the combination openings of the respective blocks are tightly contacted in this state and clamped with screws at the superposed portions of the openings, the longitudinal positions are determined and fixed by the engagement of the downward flange and the upward groove, the elevational positions are determined and fixed by the flat upper surface of the boss and the flat downward portion of the guide rib. The lateral positions of the abutting blocks are determined and fixed by clamping with screws, and this coupling structure can be completed without particularly skillful technique.

However, since the guide rib and the boss as the coupling means of the conventional console box protrude vertically from the side walls of the respective blocks and perpendicularly to the contact surfaces of the boss and the guide rib, the guide rib and the boss tend to collide when assembling the front and rear blocks causing an unreasonable force to be applied thereto.

Further, the conventional console box requires a complicated molding die to be constructed.

SUMMARY OF THE INVENTION

It is accordingly, an object of this invention to provide a console box of the longitudinal split type for an automobile which eliminates the abovementioned drawbacks and disadvantages, and which can be simply assembled.

In order to achieve the above and other objects, there is provided a console box of the longitudinal split type for an automobile. The console box is split into front and rear blocks. In a preferred embodiment, upward and downward projecting strips engage with each other at the ends of opposed upper walls of the split front and rear blocks respectively, and an extension is projected toward the front block from the side walls of the rear block. A cutout corresponding to the extension at the side wall of the rear block is provided in the front block. A platelike seat capable of contacting the inner surface of the side wall of the rear block projects from the side wall of the front block.

In the console box of longitudinal split type for an automobile according to the preferred embodiment, the protruding strips of the front and rear blocks are engaged, and both blocks are rotated with the position of the projecting strips as a fulcrum under the guidance of the platelike seat. When the rotation of the blocks is completed, the extension of the side wall of the rear block is engaged within the cutout of the side wall of the front block. Simultaneously, the upper end of the extension is engaged with the upper end of the cutout, and the protruding strips are completely engaged. Accordingly, both the blocks are smoothly coupled, and when the coupling operation of the blocks is completed, elevational, lateral and longitudinal positionings of the blocks is completed.

BRIEF DESCRIPTION OF THE DRAWINGS

The above and other related objects and features of the invention will be apparent from a reading of the following description taken together with the accompanying drawings, wherein.

DESCRIPTION OF THE PREFERRED EMBODIMENTS

Figure 1:
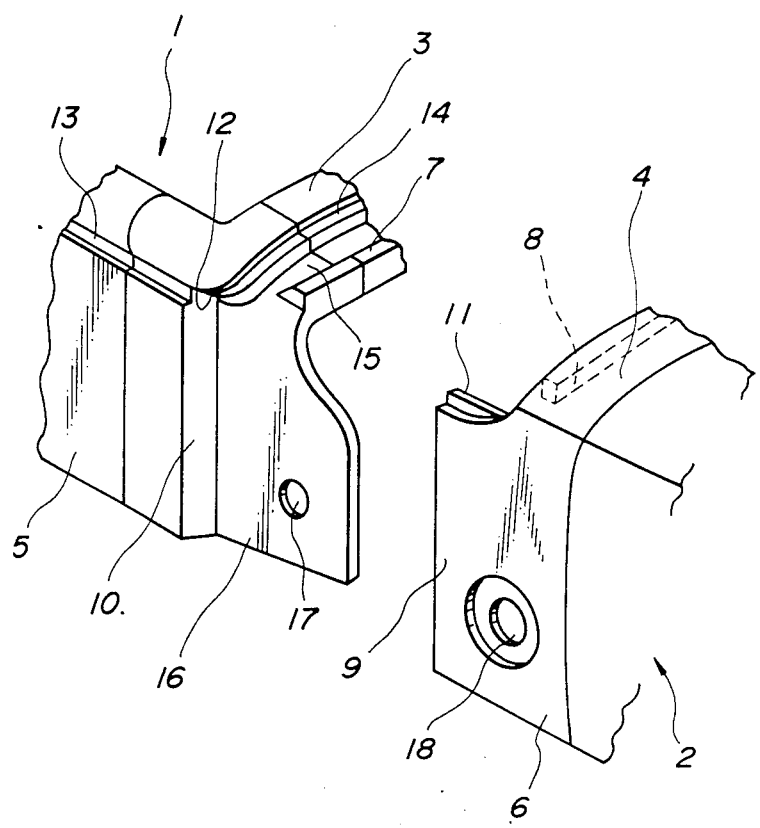
FIG. 1 is a partial perspective view of the coupling portion of an embodiment of a console box of the longitudinal split type according to the present invention.
Figure 2:
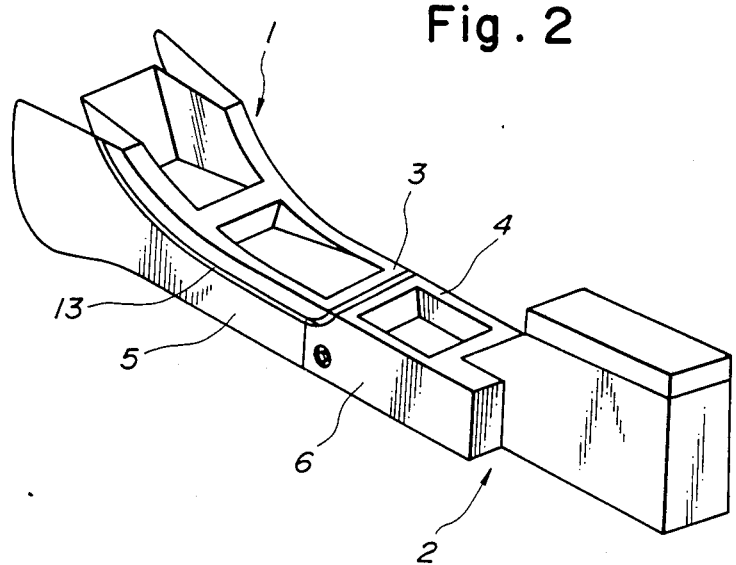
FIG. 2 is a perspective view of the entire console box.
Figure 3:
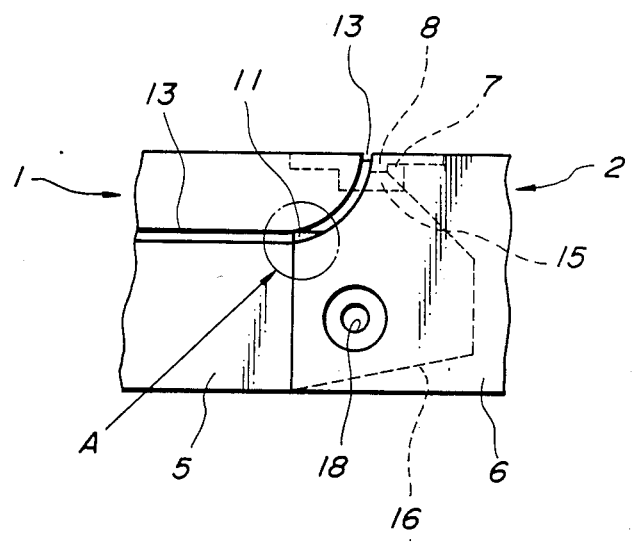
FIG. 3 is a side view of the coupling portion.
Figure 4:
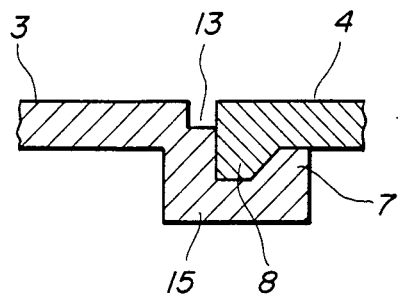
FIG. 4 is a vertical sectional view of the coupling portion of the upper wall.

This invention will now be described in detail with reference to FIGS. 1 through 7, which show an embodiment of the console box according to this invention. In FIGS. 1 and 2, numeral 1 designates the front block of the console box mounted frontwardly in the longitudinal direction of a vehicle, and numeral 2 designates a rear block mounted rearwardly. Both the blocks 1 and 2 have uppers walls 3, 4 and side walls 5, 6, respectively. Protruding strips 7 and 8 are engaged with each other as shown in FIGS. 1, 3 and 4 and are provided upwardly and downwardly respectfully at the ends of the upper walls 3 and 4 of the opposed blocks 1 and 2. In this case, the upward strip 7 is formed at the end of the protruding portion 15 spaced from the front edge of the upper wall 3, wherein the protruding portion 15 becomes a guide for matching the upper surfaces of the upper walls 3 and 4 of the blocks 1 and 2 in the same plane when the strips 7 and 8 are engaged with each other.

Figure 5:
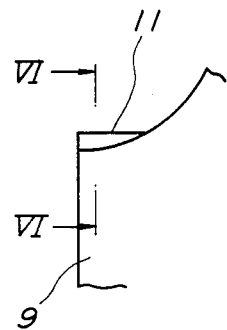
FIG. 5 is a side view of the coupling portion of the side wall corresponding to the portion A in FIG. 3.
Figure 6:
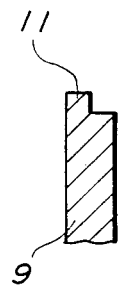
FIG. 6 is a sectional view taken along the line VI—VI of FIG. 5.
Figure 7:
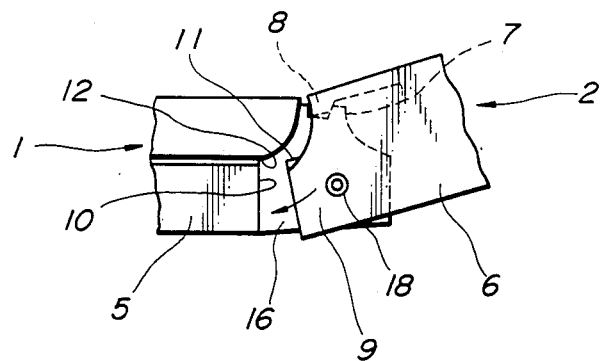
FIG. 7 is a side view of the coupling portion at the start of assembling the console box.

Further, an extension 9 is projected toward the front block 1 from the side wall 6 of the rear block 2. A cutout 10 corresponding to the extension 9 is formed on the side wall 5 of the front block 1. The extension 9 is formed to continue with the front end of the upper wall 4 at the upper end thereof. As shown in FIGS. 5 and 6, a projecting strip 11 is extended perpendicularly to the strips 7, 8 at the upper end of the extension 9, and an overhang 12 of step shape to be engaged with the strip 11 is formed at the upper end of the cutout 10 in the front block 1.

In FIGS. 1 and 2, numeral 13 depicts a decorative groove formed at the upper wall with a step 14 formed at the front end of the upper wall 3 of the front block 1 and the front end of the upper wall 4 of the rear block 2. Groove 13 is formed in the boundary between the upper wall 3 and the side wall 5 of the front block 1. Further, groove 13 passes through the upper end of the extension 9, and the strip 11 is formed by the groove 13.

A platelike seat 16 extending from the protruding portion 15 of the upper wall 3 is formed at the front end of the side wall 5 of the front block 1. The seat 16 is formed in the same thickness as the protruding portion 15, and a trapezoidal shape is protruded from the front end of the side wall 5 to be contacted in a planar manner with the inner wall of the rear block 2. An opening 17 is provided at the center of the seat 16, and an opening 18 is also formed at the side wall extension 9 of the rear block 2 corresponding to the opening 17 in such a manner that both the opneings 17 and 18 are communicated when the blocks 1 and 2 are assembled so that a tapping screw (not shown) may be inserted therethrough.

In order to assemble the console box as described above, as shown first in FIG. 7, the rear block 2 is moved in a slightly tilted state toward the block 1, and the strips 7, 8 of both the blocks 1, 2 are engaged. Simultaneously, the seat 16 is contacted with the inner surface of the side wall 6 of the rear block 2. Then, with the engaged strips 7, 8 as a fulcrum, the block 2 is rotated downwardly. Then, the strip 11 of the upper end of the extension 9 becomes engaged with the overhang 12, and the extension 9 is also engaged within the cutout 10. In this manner, both the blocks 1, 2 are positioned in the longitudinal direction by the engaging action of the strips 7, 8 in the lateral direction by the planar contacting action of the side wall 6 and the seat 16, and in the elevational direction by the engaging action of the extension 9 and the cutout 10, thereby providing the surfaces of the blocks 1 and 2 as a continuous surface.

Next, a tapping screw is inserted into the openings 17 and 18, and the blocks 1, 2 are rigidly, fixedly coupled.

According to the present invention, the console box is constructed as indicated above. The longitudinal, elevational and lateral positioning and securing of the blocks can be simply and readily performed without the conventional guide rib and boss projecting vertically from the walls of the conventional blocks, thereby substantially eliminating impact during assembly of the front and rear blocks 1, 2. Thus, the blocks may be smoothly integrated without unreasonable force.

Further, since the console box of this invention employs no various crossing guide ribs, the blocks 1, 2 may be readily molded.

It is to be noted that the block coupling structure described as associated with the front block 1 (e.g., the seat 16) may be alternatively provided on the rear block 2 and vice versa. Further, though the extension 9 and seat 16 are shown only at the left side, they may be formed symetrically at the right side within the spirit and scope of the present invention.

What is claimed is:

1. A console box for an automobile, split longitudinally into front and rear blocks, said console box comprising:
    upwardly and downwardly projecting strips engaged with each other at the ends of opposed upper walls of the front and rear blocks;
    an extension projecting toward one of said blocks from a side wall of the other of said blocks;
    a cutout portion in said one block corresponding to the extension at the side wall of said other block; and
    a platelike seat projecting from the side wall of said one block, said seat contacting the inner surface of the side wall of said other block when said blocks are coupled together.

2. The console box according to claim 1, wherein said upwardly projecting strip is formed at the end of a protruding portion on said one block spaced from a front edge of the upper wall thereof, wherein said upwardly and downwardly projecting strips act as guides such that when said strips are engaged and said blocks are coupled together, upper surfaces of the upper walls of both said blocks lie in substantially the same plane.

3. The console box according to claim 1, wherein said extension is formed continuously at the upper end thereof with a front end of the upper wall of said other block.

4. The console box according to claim 1, wherein a protruding strip is formed to extend perpendicularly to said upwardly and downwardly projecting strips, at the upper edge of said extension, and an overhang engageable with the protruding strips is formed at an upper edge of the cutout.

5. The console box according to claim 2, wherein said platelike seat is of the same thickness as the protruding portion, said platelike seat projecting in a substantially trapezoidal shape at the front end of a side wall of said one block to be contacted in a planar manner with the inner wall of the other of said blocks when said blocks are coupled together.

6. The console box according to claim 1, wherein said platelike seat is formed with a first opening therethrough and said extension has a second opening corresponding to said first opening, wherein said openings are communicated when the blocks are assembled, to rigidly couple the blocks together.

* * * * *